United States Patent
Lau-Caruso et al.

(10) Patent No.: US 12,475,093 B1
(45) Date of Patent: Nov. 18, 2025

(54) SEMANTIC VERSIONING CALCULATOR FOR DATA PRODUCTS

(71) Applicant: INTERNATIONAL BUSINESS MACHINES CORPORATION, Armonk, NY (US)

(72) Inventors: Jenna Lau-Caruso, Holland Landing (CA); Lior Aronovich, Thornhill (CA); Priya Unnikrishnan, Richmond Hill (CA); Wing Hon Lee, Richmond Hill (CA); Leigh Chen, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/668,602

(22) Filed: May 20, 2024

(51) Int. Cl.
  *G06F 7/00* (2006.01)
  *G06F 16/21* (2019.01)
  *G06F 16/23* (2019.01)
  *H04L 67/55* (2022.01)

(52) U.S. Cl.
  CPC ........ *G06F 16/219* (2019.01); *G06F 16/2358* (2019.01); *H04L 67/55* (2022.05)

(58) Field of Classification Search
  CPC .. G06F 16/258; G06F 16/219; G06F 16/2329; G06F 16/2393; G06F 16/2358; G06F 16/1794; G06F 9/45558; G06F 9/5027; G06F 9/5072; G06Q 30/0603; G06Q 30/0623; H04L 67/55
  See application file for complete search history.

(56) References Cited

U.S. PATENT DOCUMENTS

| | | | |
|---|---|---|---|
| 11,361,354 | B2 | 6/2022 | Quinn et al. |
| 11,822,947 | B2 | 11/2023 | Chandrashekar et al. |
| 2012/0084257 | A1 | 4/2012 | Bansode et al. |
| 2018/0107635 | A1 | 4/2018 | Chen et al. |

(Continued)

FOREIGN PATENT DOCUMENTS

WO   2019/025945 A1   2/2019

OTHER PUBLICATIONS

Shraga et al., "Explaining Dataset Changes for Semantic Data Versioning with Explain-Da-V (Technical Report)", https://arxiv.org/abs/2301.13095, Jan. 30, 2023, 16 pages.

(Continued)

*Primary Examiner* — Mohammad A Sana
(74) *Attorney, Agent, or Firm* — Lily Neff; Andrew D. Wright; Calderon Safran & Wright P.C.

(57) ABSTRACT

A computer-implemented method for receiving evaluation criteria comprising rules for evaluating changes to a data file, where the data file comprises a plurality of assets. The method may further include detecting at least one change to one or more assets of the plurality of assets and identifying a category for the at least one change, based on the received evaluation criteria. In response to identifying a category for a plurality of changes, the method may aggregate the identified category of each of the plurality of changes of each asset of the data file. In response to the aggregated categories exceeding one or more predetermined thresholds, the method may further include generating a new semantic version for each changed asset of the plurality of assets and a new semantic version for the data file overall. The method may also push the new semantic version to at least one client computer.

20 Claims, 6 Drawing Sheets

(56) References Cited

U.S. PATENT DOCUMENTS

| | | | |
|---|---|---|---|
| 2020/0073940 A1* | 3/2020 | Grosset | G06F 40/30 |
| 2020/0074563 A1* | 3/2020 | Grosset | G06Q 40/12 |
| 2021/0157623 A1 | 5/2021 | Chandrashekar et al. | |
| 2021/0182875 A1* | 6/2021 | Babu | G06F 16/951 |
| 2021/0334871 A1* | 10/2021 | Quinn | G06Q 30/0603 |
| 2022/0318223 A1* | 10/2022 | Ahluwalia | G06F 16/2219 |

OTHER PUBLICATIONS

Klump et al., "Versioning Data Is About More than Revisions: A Conceptual Framework and Proposed Principles", https://datascience.codata.org/articles/10.5334/dsj-2021-012, Mar. 23, 2021, 13 pages.

Anonymous, "Automatic Semantic System Information Model Generation", https://priorart.ip.com/IPCOM/000272941, Sep. 14, 2023, 8 pages.

Anonymous, "System and Method to Assess Modernization Complexity of Legacy Applications Based on Component Version Upgrade Computation", https://priorart.ip.com/IPCOM/000272401, Jun. 2, 2023, 7 pages.

Anonymous, "System for Dynamic Enablement Content Generation and Responsible Asset Reuse", https://priorart.ip.com/IPCOM/000264905, Feb. 5, 2021, 6 pages.

Sompel et al., "An HTTP-Based Versioning Mechanism for Linked Data", https://arxiv.org/abs/1003.3661, Mar. 18, 2010, 10 pages.

Seering et al., "Efficient Versioning for Scientific Array Databases", https://ieeexplore.ieee.org/document/6228152, Apr. 1-5, 2012, 12 pages.

Wang et al., "Conceptual Modeling for Advanced Application Domains", Website, Nov. 8-12, 2004, 706 pages.

Castro et al., "Schema Versioning for Multitemporal Relational Databases", https://www.sciencedirect.com/science/article/abs/pii/S0306437997000173, Jul. 1997, 42 pages.

Huang, "Effective Data Versioning for Collaborative Data Analytics", https://dl.acm.org/doi/abs/10.1145/3318464.3394027, Jun. 2020, 7 pages.

Semver, "Semantic Versioning 2.0.0", https://semver.org/, Page Accessed Jan. 30, 2024, 10 pages.

Lam et al., "Putting the Semantics into Semantic Versioning", https://arxiv.org/abs/2008.07069, Aug. 17, 2020, 23 pages.

Anonymous, "Versioning Systems to Support Full and Incremental Data Set Updates", https://priorart.ip.com/IPCOM/000230623, Aug. 27, 2013, 16 pages.

Anonymous, "A system and method to protect and control distributed data versions", https://priorart.ip.com/IPCOM/000264058, Nov. 6, 2020, 11 pages.

Golfarelli et al., "Schema Versioning in Data Warehouses", https://link.springer.com/chapter/10.1007/978-3-540-30466-1_38, Jan. 2005, 8 pages.

Baral, "Semantic versioning for Data Products", https://medium.com/@baral.malay/semantic-versioning-for-data-products-e887f082f17d, Apr. 9, 2023, 9 pages.

Falster et al., "Datastorr: a workflow and package for delivering successive versions of 'evolving data' directly into R", https://academic.oup.com/gigascience/article/8/5/giz035/5482388, May 1, 2019, 25 pages.

Koren et al., "Semantic Versioning for Data Products", https://medium.com/data-architect/semantic-versioning-for-data-products-2b060962093, Jan. 14, 2019, 10 pages.

Anonymous, "Batch processing", Wikipedia, Mar. 29, 2024, 6 pages, doi: https://en.wikipedia.org/w/index.php?title=Batch_processing&oldid=1216171198.

International Searching Authority, "Notification of Transmittal of the International Search Report and the Written Opinion of the International Searching Authority, or Declaration," Patent Cooperation Treaty, Sep. 4, 2025, 11 pages, International Application No. PCT/EP2025/063723.

* cited by examiner

SEMANTIC VERSIONING CALCULATOR FOR DATA PRODUCTS

BACKGROUND

Aspects of the present invention relate generally to semantic versioning control and data storage systems and, more particularly, to an automated semantic versioning system.

A data product (also referred to as a data file herein) is a collection of one or more assets which may include datasets as well as derivative assets such as notebooks, dashboards, reports, machine learning models, etc. Each data product may have multiple delivery methods. For example, a dataset may be consumed as a downloadable file, by direct connection to a database, or as a virtualized as a view with data protection rules applied.

A data product marketplace may contain thousands of data products, each consisting of one or more assets of various types. In the marketplace model, data products are published by individual owners or owning organizations, each with their own operating standards. Each asset within a data product evolves individually, as the underlying assets are updated. Additionally, data products may reference other data products, which contain assets that are themselves evolving on their own timeline. In some cases, data products will reference a static copy of a dataset. In other cases, the data may point to a live stream of data.

SUMMARY

In a first aspect of the invention, there is a computer-implemented method including: receiving, by a processor set, evaluation criteria comprising rules for evaluating changes to a data file, wherein the data file comprises a plurality of assets; detecting, by the processor set over time, at least one change to one or more assets of the plurality of assets; identifying, by the processor set, a category for the at least one change, based on the received evaluation criteria; in response to identifying a category for a plurality of changes, aggregating, by the processor set, the identified category of each of the plurality of changes of each asset of the data file; in response to the aggregated categories exceeding one or more predetermined thresholds, generating, by the processor set, a new semantic version for each changed asset of the plurality of assets and a new semantic version for the data file overall; pushing the new semantic version for each changed asset to at least one client computer having an outdated version of at least one changed asset, such that the at least one client computer uses the new semantic version for downstream tasks.

In another aspect of the invention, there is a computer program product including one or more computer readable storage media having program instructions collectively stored on the one or more computer readable storage media. The program instructions are executable to: receive evaluation criteria comprising rules for evaluating changes to a data file, wherein the data file comprises a plurality of assets; detect at least one change to one or more assets of the plurality of assets; identify a category for the at least one change, based on the received evaluation criteria; in response to identifying a category for a plurality of changes, aggregate the identified category of each of the plurality of changes of each asset of the data file; in response to the aggregated categories exceeding one or more predetermined thresholds, generating a new semantic version for each changed asset of the plurality of assets and a new semantic version for the data file overall; push the new semantic version for each changed asset to at least one client computer having an outdated version of at least one changed asset, such that the at least one client computer uses the new semantic version for downstream tasks.

In another aspect of the invention, there is a system including a processor set, one or more computer readable storage media, and program instructions collectively stored on the one or more computer readable storage media. The program instructions are executable to: receive evaluation criteria comprising rules for evaluating changes to a data file, wherein the data file comprises a plurality of assets; detect at least one change to one or more assets of the plurality of assets; identify a category for the at least one change, based on the received evaluation criteria; in response to identifying a category for a plurality of changes, aggregate the identified category of each of the plurality of changes of each asset of the data file; in response to the aggregated categories exceeding one or more predetermined thresholds, generating a new semantic version for each changed asset of the plurality of assets and a new semantic version for the data file overall; and push the new semantic version for each changed asset to at least one client computer having an outdated version of at least one changed asset, such that the at least one client computer uses the new semantic version for downstream tasks.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to semantic versioning control and data storage systems and, more particularly, to an automated semantic versioning system. Embodiments and aspects of the invention provide systems and methods that improve and advance the technology in a specific and practical application. In other words, the systems and methods automatically detect a magnitude and significance of changes, eliminate any subjective manual analyses, and cover both data level versioning and schema (metadata delta) versioning in one interoperable system and/or method.

According to an aspect of the invention, there is a computer-implemented method and system for a semantic versioning calculator for data products (i.e., data files) to ensure understanding differences between different versions of data products based on magnitude/significance of changes, where each data product is a collection of assets of different asset types. The method and system include: defining criteria for major version changes, minor version changes, and patch version changes for a plurality of asset types; detecting changes over time to each asset of a data product; for each change, identifying a level of significance of the change; aggregating the levels of significance for the changes across the assets of the data product; and generating a new semantic version for each asset and for the data product overall.

According to an aspect of the invention, there is a computer-implemented method including: receiving, by a processor set, evaluation criteria comprising rules for evaluating changes to a data file, wherein the data file comprises a plurality of assets; detecting, by the processor set over time, at least one change to one or more assets of the plurality of assets; identifying, by the processor set, a category for the at least one change, based on the received evaluation criteria; in response to identifying a category for a plurality of changes, aggregating, by the processor set, the identified category of each of the plurality of changes of each asset of the data file; in response to the aggregated categories exceeding one or more predetermined thresholds, generating, by the processor set, a new semantic version for each changed asset of the plurality of assets and a new semantic version for the data file overall; and pushing the new semantic version for each changed asset to at least one client computer having an outdated version of at least one changed asset, such that the at least one client computer uses the new semantic version for downstream tasks. The foregoing features provide a method that overcomes problems in the existing technology by automatically detecting the magnitude and significance of changes, eliminate any subjective manual analysis, and cover both data level versioning and schema (metadata delta) versioning in one interoperable system. Furthermore, by pushing the new semantic version to clients having an outdated version, the method will ensure that each downstream client has the most updated version and will avoid time-consuming versioning issues. Thereby creating more reliable, efficient, and predictable system and method for an automated semantic versioning method.

In embodiments, the received evaluation criteria further includes rules for defining a major change, a minor change, and a patch change. By defining distinct rules for specific categories, the method will provide a more reliable and a more predictable method.

In embodiments, the data file comprises a plurality of asset types. By providing a method capable of handling multiple asset types, the method will provide a more robust method for handling various kinds of data, thereby providing a more reliable, efficient, and predictable method.

In embodiments, the data file comprises structured data and unstructured data. By providing a method capable of handling multiple data types, the method will provide a more robust method for handling various kinds of data, thereby providing a more reliable, efficient, and predictable method.

In embodiments, the identifying the category for the at least one change is performed using a machine learning algorithm. By identifying the category using a machine learning algorithm, the method will automatically detect the magnitude and significance of changes and eliminate any subjective manual analysis, thereby creating more reliable, efficient, and predictable method for semantic versioning.

In embodiments, the method further includes training the machine learning algorithm to identify categories for the at least one change to structured data or to unstructured data. By identifying the category for the at least one change to structured data and/or to unstructured data using a machine learning algorithm, the method will automatically detect the magnitude and significance of changes and eliminate any subjective manual analysis, thereby creating more reliable, efficient, and predictable method for semantic versioning.

In embodiments, the method further includes calculating a weight for each asset of a plurality of assets, wherein identifying the category for the at least one change is further based on the calculated weight for each asset. By calculating the weight for each asset, the method will provide additional reliability and a more accurate category identification because the weighting will allow the method to place a greater emphasis on more important assets, thereby creating more reliable, efficient, and predictable method for semantic versioning.

In some embodiments, the processor set and the at least one client computer are controlled by the same entity. By controlling the versioning of data assets and data files at processor sets and client computers controlled by (e.g., owned and/or operated by) the same entity such as an enterprise, the entity can ensure that the most updated versions of the data assets and data files are being used within the entity's systems and avoids downtime and errors caused by outdated data.

In embodiments, the method further includes notifying clients (e.g., client computers) that the new semantic version has been generated. By notifying clients about the new semantic version, the method will ensure that each downstream client is aware that they are not using the most updated version. This reassures clients/users that they are relying on the most updated versions of the data assets and data files and thereby provides a more efficient process by saving clients/users time from having to find and verify that they are using the most updated versions.

According to an aspect of the invention, there is a computer program product including one or more computer readable storage media having program instructions collectively stored on the one or more computer readable storage media. The program instructions are executable to: receive evaluation criteria comprising rules for evaluating changes to a data file, wherein the data file comprises a plurality of assets; detect at least one change to one or more assets of the plurality of assets; identify a category for the at least one change, based on the received evaluation criteria; in response to identifying a category for a plurality of changes, aggregate the identified category of each of the plurality of changes of each asset of the data file; in response to the aggregated categories exceeding one or more predetermined thresholds, generating a new semantic version for each changed asset of the plurality of assets and a new semantic version for the data file overall; and push the new semantic version for each changed asset to at least one client computer having an outdated version of at least one changed asset, such that the at least one client computer uses the new semantic version for downstream tasks. The foregoing features provide a computer program product that overcomes problems in the existing technology by automatically detecting the magnitude and significance of changes, eliminate any subjective manual analysis, and cover both data level versioning and schema (metadata delta) versioning in one interoperable system. Furthermore, by pushing the new semantic version to clients having an outdated version, the computer program product will ensure that each downstream client has the most updated version and will avoid time-consuming versioning issues. Thereby creating more reliable, efficient, and predictable system and method for an automated semantic versioning system.

In embodiments, the data file comprises a plurality of data types comprising structured and unstructured data. By providing a computer program product capable of handling multiple data types, the computer program product will provide a more robust method for handling various kinds of data, thereby providing a more reliable, efficient, and predictable computer program product.

In embodiments, the computer program product further includes program instructions to identify the category for the at least one change is performed using a machine learning algorithm. By identifying the category using a machine learning algorithm, the computer program product will automatically detect the magnitude and significance of changes and eliminate any subjective manual analysis, thereby creating more reliable, efficient, and predictable computer program product for semantic versioning.

In embodiments, the computer program product further includes program instructions to train the machine learning algorithm to identify categories for the at least one change to structured data or to unstructured data. By identifying the category for the at least one change to structured data and/or to unstructured data using a machine learning algorithm, the computer program product will automatically detect the magnitude and significance of changes and eliminate any subjective manual analysis, thereby creating more reliable, efficient, and predictable computer program product for semantic versioning.

In embodiments, the computer program product further includes program instructions to notify clients having an outdated version that the new semantic version has been generated. By notifying clients about the new semantic version, the computer program product will ensure that each downstream client is aware that they are using the most updated version. This reassures clients/users that they are relying on the most updated versions of the data assets and data files and thereby provides a more efficient process by saving clients/users time from having to find and verify that they are using the most updated versions.

According to an aspect of the invention, there is a system including a processor set, one or more computer readable storage media, and program instructions collectively stored on the one or more computer readable storage media. The program instructions are executable to: receive evaluation criteria comprising rules for evaluating changes to a data file, wherein the data file comprises a plurality of assets; detect at least one change to one or more assets of the plurality of assets; identify a category for the at least one change, based on the received evaluation criteria; in response to identifying a category for a plurality of changes, aggregate the identified category of each of the plurality of changes of each asset of the data file; in response to the aggregated categories exceeding one or more predetermined thresholds, generating a new semantic version for each changed asset of the plurality of assets and a new semantic version for the data file overall; and push the new semantic version for each changed asset to at least one client computer having an outdated version of at least one changed asset, such that the client computer uses the new semantic version for downstream tasks. The foregoing features provide a system that overcomes problems in the existing technology by automatically detecting the magnitude and significance of changes, eliminate any subjective manual analysis, and cover both data level versioning and schema (metadata delta) versioning in one interoperable system. Furthermore, by pushing the new semantic version to clients having an outdated version, the system will ensure that each downstream client has the most updated version and will avoid time-consuming versioning issues. Thereby creating more reliable, efficient, and predictable system and method for an automated semantic versioning system.

In embodiments, the received evaluation criteria further includes rules for defining a major change, a minor change, and a patch change. By defining distinct rules for specific categories, the system will provide a more reliable and a more predictable system.

In embodiments, the data file comprises a plurality of asset types. By providing a system capable of handling multiple asset types, the system will provide a more robust system handling various kinds of data, thereby providing a more reliable, efficient, and predictable system.

In embodiments, the system further includes program instructions to identify the category for the at least one change is performed using a machine learning algorithm. By identifying the category using a machine learning algorithm, the method will automatically detect the magnitude and significance of changes and eliminate any subjective manual analysis, thereby creating more reliable, efficient, and predictable method for semantic versioning.

In embodiments, the system further includes program instructions to train the machine learning algorithm to identify categories for the at least one change to structured data or to unstructured data. By identifying the category for the at least one change to structured data and/or to unstructured data using a machine learning algorithm, the system will automatically detect the magnitude and significance of changes and eliminate any subjective manual analysis, thereby creating more reliable, efficient, and predictable system for semantic versioning.

In embodiments, the system further includes program instructions to notify clients having an outdated version that the new semantic version has been generated. By notifying clients about the new semantic version, the system will ensure that each downstream client is aware that they are not using the most updated version. This will reassure clients/users that they are relying on the most updated versions of the data assets and data files and thereby provides a more efficient process by saving clients/users time from having to find and verify that they are using the most updated versions.

Implementations of the invention are necessarily rooted in computer technology. For example, the steps of receiving, by a processor set, evaluation criteria comprising rules for evaluating changes to a data file; detecting, by the processor set over time, at least one change to one or more assets of the plurality of assets; identifying, by the processor set, a category for the at least one change, based on the received evaluation criteria; aggregating, by the processor set, the identified category of each of the plurality of changes of each asset of the data file; and generating, by the processor set, a new semantic version for each changed asset of the plurality of assets and a new semantic version for the data file overall, are computer-based and cannot be performed in the human mind. Given this scale and complexity, it is simply not possible for the human mind, or for a person using pen and paper, to perform the number of calculations involved in training and/or using a machine learning model.

Implementations of the invention improve the technological field of data file (e.g., data product) reliability and availability, and the implementations improve the functioning of a computer. As explained above, a data product marketplace may contain thousands of data products, each consisting of one or more assets of various types. In the marketplace model, data products are published by individual owners or owning organizations, each with their own operating standards. Each asset within a data product evolves individually, as the underlying assets are updated. Additionally, data products may reference other data products, which contain assets that are themselves evolving on their own timeline. In some cases, data products will reference a static copy of a dataset. In other cases, the data may point to a live stream of data. However, when data is used in downstream processes, for example as part of an extract, transform, load (ETL) job, or for building a report, changes in the contents of the data are expected, but changes in the structure of the data can break automated processes and render the ETL job inoperable and/or otherwise unable to complete its task.

Existing technologies fall short and do not provide reliable versioning control, a standardized versioning calculator, or adequate methods for notifying downstream users/consumers of major, minor, and/or patch changes. Simply stated, downstream data consumers are unable to fully trust a data file's version number, understand which changes require action, etc. For example, existing methods do not distinguish between a minor update to a data product where only the metadata of data product was changed and major update having a schema change or new data snapshot, which may require downstream code revisions or model retraining. These situations have very different implications for a downstream data consumer and currently users are unable to discern between the varying levels of changes between versions of a data file (e.g., a data product). Thus, without consistent versioning, data producers define versions independently using their own versioning conventions, making versions subjective to the opinion of the data producer. As a result, data consumers must waste time evaluating any changes to the data they are using on a case-by-case basis. The risk of misinterpreting the significance of a change to the data they are using can cause wasted development cycles or computing resources, or worse, could lead to broken downstream applications or inadvertently invalidated their research.

Embodiments and aspects of the invention provide a system and method that improves and advances the technology in a specific and practical application. In other words, the systems and methods described herein overcome the foregoing problems by automatically detecting the magnitude and significance of changes, eliminate any subjective manual analysis, and cover both data level versioning and schema (metadata delta) versioning in one interoperable system. Furthermore, the systems and methods described herein provides a mechanism for creating versions of data products that include multiple data resources of different asset types, for publishing features to ensure that new versions of data products are published based on the magnitude and significance of changes. The systems and methods described herein support both schema changes and data changes during version calculation, allowing for easy comparison of different versions and giving users a better understanding of the changes made to their data products. Thus, improving the technological field of semantic versioning control and data storage systems and improving the functioning of a computer by creating more reliable, efficient, and predictable system and method for an automated semantic versioning system.

Furthermore, training and using a machine learning model are, by definition, performed by a computer and cannot practically be performed in the human mind (or with pen and paper) due to the complexity and massive amounts of calculations involved. For example, an artificial naïve Bayes algorithm or decision tree algorithm may have millions or even billions of weights that represent connections between nodes in different layers of the model. The values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
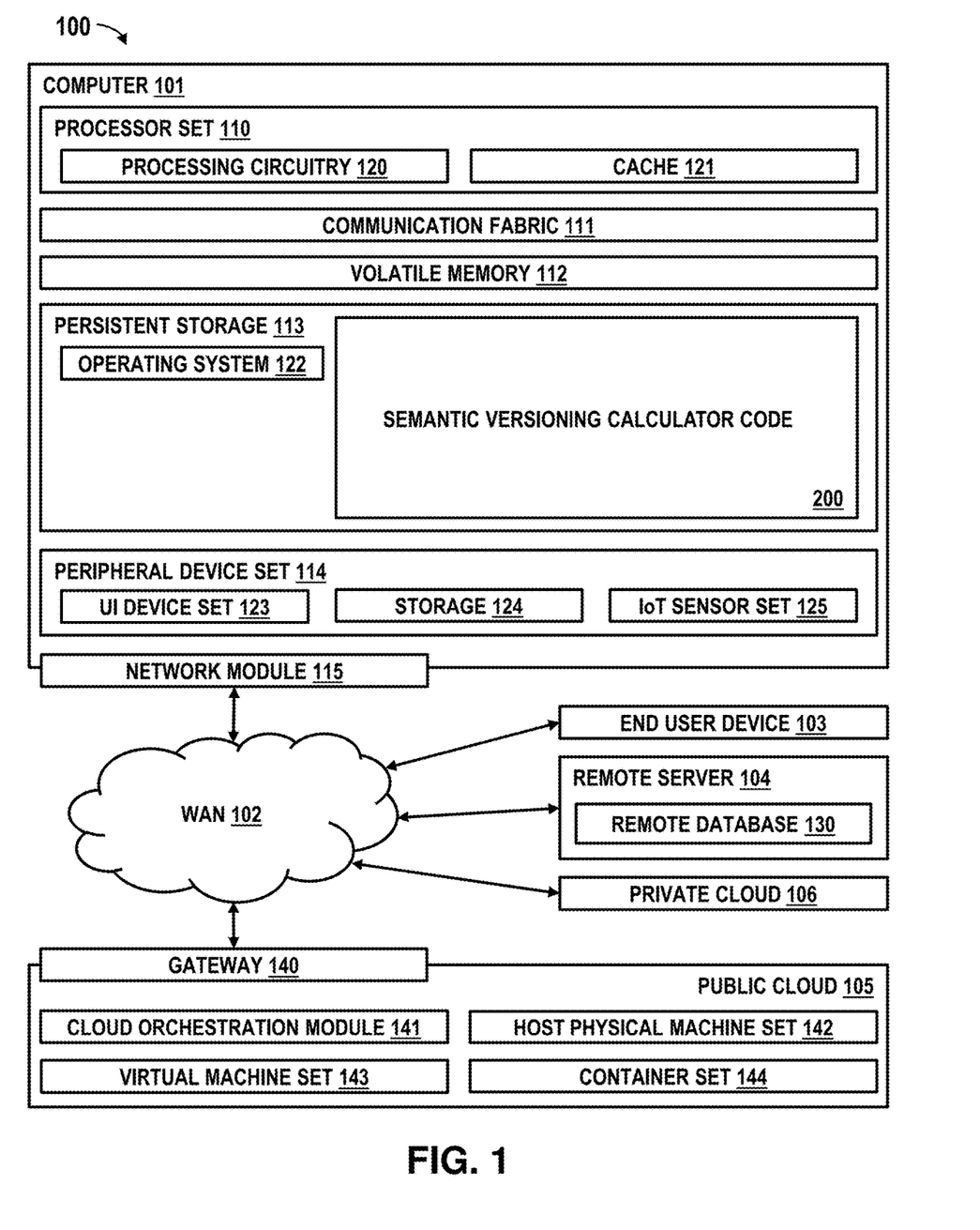
FIG. 1 depicts a computing environment according to an embodiment of the present invention.

Computing environment 100 contains an example of an environment for the execution of at least some of the computer code involved in performing the inventive methods, such as the semantic versioning calculator code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT)

sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
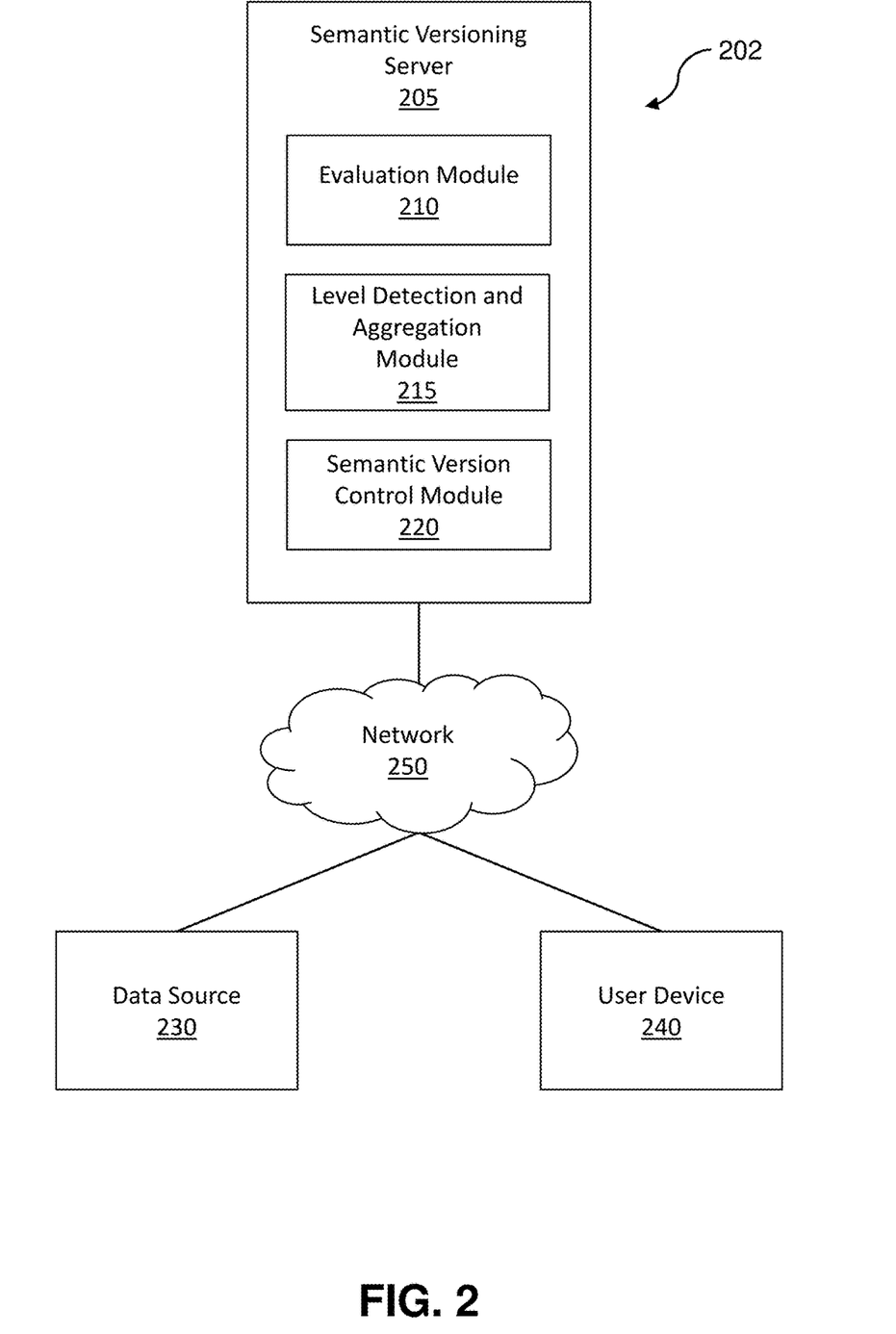
FIG. 2 shows a block diagram of an exemplary environment in accordance with aspects of the present invention.

FIG. 2 shows a block diagram of exemplary environment 202 in accordance with aspects of the invention. In embodiments, environment 202 includes semantic versioning server 205, data source 230, user device 240, and network 250.

Semantic versioning server 205 may comprise one or more instances of computer 101 of FIG. 1. In another example, semantic versioning server 205 may comprise one or more virtual machines or containers running on one or more instances of computer 101 of FIG. 1. In embodiments, semantic versioning server 205 communicates with data source 230, and user device 240 via network 250, which may comprise WAN 102 of FIG. 1. In embodiments, data source 230 comprises one or more data sources each comprising an instance of remote database 130 and/or remote server 104 of FIG. 1. In embodiments, user device 240 comprises one or more instances of end user device 103 of FIG. 1. There may be plural different instances of user device 240 including, for example, user-accessible servers and/or personal computing devices. The different instances of user device 240 may be used by different users and evaluators, respectively.

In embodiments, semantic versioning server 205 of FIG. 2 comprises evaluation module 210, level detection and aggregation module 215, and semantic version control module 220, each of which may comprise modules of semantic versioning calculator code of block 200 of FIG. 1. Such modules may include routines, programs, objects, components, logic, data structures, and so on that perform a particular task (or tasks) or implement a particular data type (or types) that the semantic versioning calculator code of block 200 uses to carry out the functions and/or methodologies of embodiments of the invention as described herein. These modules of semantic versioning calculator code of block 200 are executable by computer 101 of FIG. 1 (e.g., processing circuitry 120 of FIG. 1) to perform the inventive methods as described herein. Semantic versioning server 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, evaluation module 210 is configured to receive/access evaluation criteria comprising rules for evaluating changes to a data file, wherein the data file comprises a plurality of assets. As used herein, a data file is a collection of one or more assets with may include datasets as well as derivative assets such as notebooks, dashboards, reports, machine learning models, etc. In embodiments, a data file may be a data product. Further, each data file may have multiple delivery methods. For example, a dataset may be consumed as a downloadable file, by direct connection to a database, or as a virtualized view with data protection rules applied. Assets of the data file may be resource files within and/or relied on by the data file. An asset type may describe the type of asset/resource file (e.g., a table, database table, comma separated values (CSV) file, notebook, notebooks, dashboards, reports, machine learning models, etc.) within and/or relied on by the data file. In embodiments, a data file may be a data product or a suite of data products that is offered to consumers within a data product marketplace. In such a data product marketplace, data products are published by individual owners or owning organizations, each with their own operating standards. Each asset within a data file (e.g., data product) evolves individually, as the underlying assets are updated.

In embodiments, evaluation module 210 may be further configured to detect at least one change to one or more assets of the plurality of assets. In other words, evaluation module 210 may monitor each asset of the plurality of asset types to determine whether any changes have occurred. Changes may be detected by comparing a previous version of the asset against a new version of the asset to determine what, if any, changes have occurred.

In accordance with aspects of the invention, level detection and aggregation module 215 is configured to identify a level of change for each changed asset, based on the received/accessed evaluation criteria. In other words, level detection and aggregation module 215 may use the received/accessed evaluation criteria to assign a level/category of change for each asset. For example, in an embodiment where the evaluation criteria define three different version change levels/categories (e.g., a major change, a minor change, and a patch change), level detection and aggregation module 215 assesses the changes made to each changed asset and assigns a level/category to the change. In such an embodiment, if the asset has undergone a database table schema change where column of a table was deleted, level detection and aggregation module 215 may classify the asset change as a major change because removing an entire column may render the previous version of the data file inoperable. In another embodiment, if the asset has a new column added to a dataset and/or has undergone changes to calculations used to populate a column, level detection and aggregation module 215 may classify the asset change as a minor change because the change does not render the previous version of the data file inoperable.

In embodiments, level detection and aggregation module 215 may be further configured to employ a machine learning model to identify a level of change for each change, based on the received evaluation criteria. In such embodiments, level detection and aggregation module 215 may train and/or use classifiers such as a Naïve Bayes algorithm or decision tree algorithm within its machine learning model framework to identify a level of change and assign a level/category to the change. In such embodiments, the machine learning classifier may be trained using examples of known level/categories (e.g., known major changes, minor changes, and patch changes) comprising both structured and unstructured data. For example, an original version of a database may be provided as an input to the machine learning classifier along with a modified version of that database where a column of data has been removed. In this instance, the input would further include a major change classification. In another example, an original version of textual metadata describing an asset may be provided as an input to the machine learning classifier along with a modified version of that textual metadata where three sentences and an entire paragraph of text have been modified, but the overall meaning and purpose of the text remains the same. In this instance, the input would further include a minor change classification. In this manner, the machine learning classifier may be trained using examples of known level/category changes to both structured data and unstructured data.

In embodiments, level detection and aggregation module 215 may be further configured to use a sentence encoder to determine whether a meaning of a sentence, phrase, or paragraph has changed. This may be accomplished by comparing embeddings of a previous sentence against a new sentence and determining a cosine similarity between the previous sentence, phrase, or paragraph and a new sentence phrase, or paragraph, respectively.

Level detection and aggregation module 215 may be further configured aggregate the identified category of each of the plurality of changes of each asset of the data file in response to identifying a category for a plurality of changes. In other words, level detection and aggregation module 215 may aggregate the changes for the purpose of calculating a new semantic version change per data asset for each of the plurality of data assets for which changes were made. This calculation may be determined based on the data changes applied to the data asset and the criteria defined for the data asset.

In accordance with aspects of the invention, semantic version control module 220 is configured to generate/calculate a new semantic version for each changed asset of the plurality of assets and a new semantic version for the data file overall in response to the aggregated categories exceeding one or more predetermined thresholds.

Figure 3:
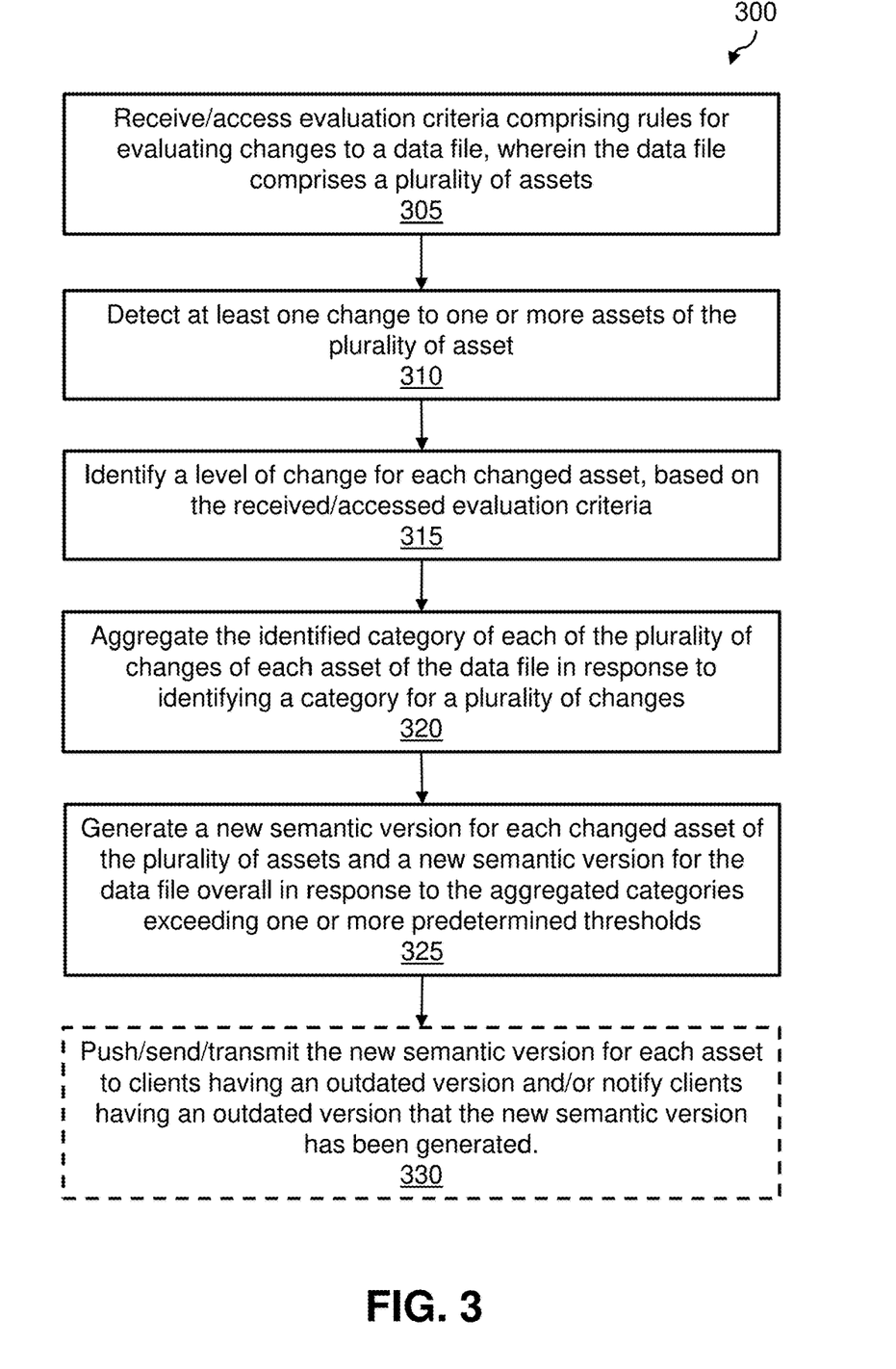
FIG. 3 shows a flowchart of an exemplary method in accordance with aspects of the present invention.

FIG. 3 shows a flowchart of exemplary method 300 in accordance with aspects of the present invention. Steps of the method may be carried out in the environment of FIG. 2 and are described with reference to elements depicted in FIG. 2.

At block 305 of FIG. 3, evaluation module 210 is configured to receive and/or access evaluation criteria comprising rules for evaluating changes to a data file, wherein the data file comprises a plurality of assets. Evaluation criteria, as used herein, may include a list of rules, thresholds, and/or definitions for evaluating version changes of a data file and/or version changes of assets within a data file and assigning a category based on the evaluation. In embodiments, the evaluation criteria (e.g., list of rules, thresholds, and/or definitions) are used to assign a category/level for changes made to an asset and/or data file.

In such embodiments, the category/level is assigned using any method or criteria to categorize/designate data changes for any desirable data processing or analyzing purpose. For example, in an embodiment the rules may define three different version change categories-a major change, a minor change, and a patch change. In such embodiments, a major change may describe data file changes that require downstream file users/consumers to migrate to a new version for the data file (e.g., data product) to remain operable. For example, a database table schema change that deletes a column of a table may be classified as a major change because removing an entire column may render the previous version of the data file inoperable. A minor change may describe data that will not require downstream users/consumers to migrate but does warrant a notification. For example, adding a column to a dataset and/or changes to calculations used to populate a column may be classified as a minor change because the change does not render the previous version of the data file inoperable. Further, a patch change may describe data changes that affect only the metadata of the data set. For example, data descriptions and/or tags added may be classified as a patch change. Additional rules, thresholds, and/or definitions could be applied. For example, an embodiment may have four different categories, five different categories, or any number of categories that may be useful in helping downstream users/consumers understand how the changes might affect their processes. In embodiments, the categories may further include sub-categories as well. In embodiments, the evaluation criteria may further include rules to be applied based on whether the data file and/or assets of the data file are consumed by direct connection or available as download. In embodiments, additional rules may apply if the database is integrated with downstream data sources.

In embodiments, evaluation module 210 of FIG. 2 is configured to receive the evaluation criteria from a user device, such as user device 240 of FIG. 2, over a network, such as network 250 of FIG. 2. In an embodiment, evaluation module 210 receives the evaluation criteria from a data source, such as data source 230 of FIG. 2, over a network, such as network 250 of FIG. 2. In other embodiments, evaluation module 210 accesses the evaluation criteria at a user device and/or data source over a network. In an embodiment, the evaluation criteria are stored locally at semantic versioning server 205.

At block 310, evaluation module 210 of FIG. 2 is configured to detect at least one change to one or more assets of the plurality of assets. In other words, evaluation module 210 may monitor each asset of the plurality of asset types to determine whether any changes have occurred over time. Changes may be detected by comparing a previous version of the asset against a new version of the asset to determine what, if any, changes have occurred.

In embodiments, changes are detected in real time as new data and/or code is committed/saved to the data file. In other embodiments, changes are detected periodically (e.g., on a fixed schedule or on a dynamic schedule). For example, in an embodiment using a dynamic schedule, changes may be detected more often for an asset/resource file that is more critical to the overall operation/success of a data file, whereas changes may be detected less often for an asset/resource file that is less critical to the overall operation/success of the data file. In such embodiments, the schedule may dynamically change as the criticality of the asset changes. In embodiments, the determination of how often (e.g., the periodicity) to detect changes for an asset may be determined using a machine learning algorithm, where the machine learning algorithm is designed to balance the need for detecting changed in more critical assets against the amount of computational power and resources needed to regularly detect those changes.

In embodiments, evaluation module 210 may be configured to take the current data file (e.g., data product) version, the metadata delta and data delta for all assets in the data file, with respect to the previous version calculation, and the criteria for mapping data changes to semantic version changes per asset type, as inputs. Evaluation module 210 may use these inputs to determine/detect changes to each asset of each data file.

At block 315, level detection and aggregation module 215 is configured to identify a level of change for each changed asset, based on the received/accessed evaluation criteria. In other words, level detection and aggregation module 215 may use the received/accessed evaluation criteria to assign a level/category of change for each asset. For example, in an embodiment where the evaluation criteria define three different version change levels/categories (e.g., a major change, a minor change, and a patch change), level detection and aggregation module 215 assesses the changes made to each changed asset and assigns a level/category to the change. In such an embodiment, if the asset has undergone a database table schema change where column of a table was deleted, level detection and aggregation module 215 may classify the asset change as a major change because removing an entire column may render the previous version of the data file inoperable. In another embodiment, if the asset has a new column added to a dataset and/or has undergone changes to calculations used to populate a column, level detection and aggregation module 215 may classify the asset change as a minor change because the change does not render the previous version of the data file inoperable.

In embodiments, level detection and aggregation module 215 may further employ a machine learning model to identify a level of change for each change, based on the received evaluation criteria. In such embodiments, level detection and aggregation module 215 may train and/or use classifiers such as a Naïve Bayes algorithm or decision tree algorithm within its machine learning model framework to identify a level of change and assign a level/category to the change. In such embodiments, the machine learning classifier may be trained using examples of known level/categories (e.g., known major changes, minor changes, and patch changes) comprising both structured and unstructured data. Optionally, continuous training can be achieved with a human in the loop to validate accuracy of the classifications. Whether a human is in the loop providing feedback or the machine learning model corrects itself, any corrections can be added to training dataset to train and/or retrain the classifiers.

In embodiments, level detection and aggregation module 215 may further comprise sentence encoding capabilities. For example, level detection and aggregation module 215 may use a sentence encoder to determine whether a meaning of a sentence, phrase, or paragraph has changed. This may be accomplished by comparing embeddings of a previous sentence against a new sentence and determining a cosine similarity between the previous sentence, phrase, or paragraph and a new sentence phrase, or paragraph, respectively.

In such embodiments, the system may determine the cosine similarity and establish similarity thresholds for determining how to categorize and changes to the data file and/or assets. When the cosine similarity between an old sentence and a new sentence is high, the system may categorize the change as a patch change. However, when the cosine similarity between an old sentence and a new sentence is low, the system may categorize the change as minor or major change depending on predetermined thresholds.

At block 320, level detection and aggregation module 215 is configured to aggregate the identified category of each of the plurality of changes of each asset of the data file in response to identifying a category for a plurality of changes. In other words, level detection and aggregation module 215 may aggregate the changes for the purpose of calculating a new semantic version change per data asset for each of the plurality of data assets for which changes were made. This calculation may be determined based on the data changes applied to the data asset and the criteria defined for the data asset. For example, if an asset has three new changes, two of which are minor in nature and one of which is a patch change, the aggregate could determine that the overall changes to the asset are minor in nature and should be treated accordingly, even though one of the changes was a patch change. In another example, an asset may have four new changes, one of which is major in nature and the rest being patch changes. In such an embodiment, the system may treat the aggregated changes as a major change and react accordingly, even though only one of the four changes was a major change. In embodiments, a specific number of minor changes, when aggregated, could result in the overall aggregation of changes being treated as a major change. For example, if an asset has six new minor changes, the system could upgrade the aggregation such that the changes are treated as a major change.

In embodiments, level detection and aggregation module 215 may further calculate weights to be assigned to each change the data file and/or assets. For example, an asset that is considered more important than other assets, meaning, the asset is relatively more important with respect to the data file/product overall, may carry more weight. For example, if an asset includes data that is heavily relied upon by other assets and/or downstream data files or it is relied upon by many users/consumers, it may be assigned a higher weight than an asset that is rarely used/called within the data file and/or by downstream data files or is used by a relatively low number of users/consumers. In such embodiments, the calculated asset weights may be used to determine the overall version delta and subsequently when assigning a change level/category to the data file. In embodiments, the weights may be used to upgrade or downgrade categorizations, based on preset evaluation criteria (e.g., rules or thresholds). For example, if an asset has a what would typically be considered a significant/major change, but there are very few (or no) users/consumers that rely on the asset (i.e., the asset has a low weighting), rules or thresholds may be set such that category of the change may be considered a minor change based on the low number of consumers. Alternatively, if an asset has what would normally be a minor change, but it is relied upon by many users/consumers (i.e., the asset has a high weighting), rules or thresholds may be set such that the change may be determined to be a major change based on the number of users/consumers that may be affected by the change.

At block 325, semantic version control module 220 is configured to generate a new semantic version for each changed asset of the plurality of assets and a new semantic version for the data file overall in response to the aggregated categories exceeding one or more predetermined thresholds. In embodiments, semantic version control module 220 may apply the same versioning rules and the same naming convention for each asset and each data file.

For example, a sample data file may be titled "Retail Revenue" and may comprise a CSV file named "revenue-quarterly.csv" that contains quarterly revenue data for a retail store, and a notebook file named "revenue-analytics.ipynb which performs analytics on the data in the CSV file. In this example, when the data product is created, all versions are 1.0.0 (e.g., Retail Revenue: v1.0.0; revenue-quarterly.csv: v1.0.0; and revenue-analytics.ipynb: v1.0.0). The product may then go through several changes. For each change, the version of individual assets and the data file have varying significance according to the classifier configurations described herein, and the versioning may be calculated and updated according to the following examples.

New file added example: Continuing the example above, a new file may be added to the data product, causing a minor version update at the data file level, but not at the asset level: Retail Revenue: v1.1.0; revenue-quarterly.csv: v1.0.0; revenue-quarterly-regional.csv: v1.0.0; and revenue-analytics.ipynb: v1.0.0.

Minor change example: Continuing the example above, the data in the CSV file may be refreshed with information for the next quarter, causing another minor version update at the data file level and an update to the quarterly files: Retail Revenue: v1.2.0; revenue-quarterly.csv: v1.0.1; revenue-quarterly-regional.csv: v1.0.1; and revenue-analytics.ipynb: v1.0.0.

Major change example Continuing the example above, the schema in both CSV files is changed to remove a column. Because this is a breaking change (i.e., it would render the downstream files inoperable), causing a major version up of one of the assets and the data file: Retail Revenue: v2.0.0; revenue-quarterly.csv: v2.0.0; revenue-quarterly-regional.csv: v2.0.0; and revenue-analytics.ipynb: v1.0.0.

Patch Level Update example: Continuing the example above, bug fixes may be made in the notebook file code resulting in a patch level update at the data file and the notebook file: Retail Revenue: v2.0.1; revenue-quarterly.csv: v2.0.0; revenue-quarterly-regional.csv: v2.0.0; and revenue-analytics.ipynb: v1.0.1.

Minor changes example: Continuing the example above, a new column may be added to both of the CSV files resulting in minor changes to the data file and CSV files: Retail Revenue: v2.1.1; revenue-quarterly.csv: v2.1.0; revenue-quarterly-regional.csv: v2.1.0; and revenue-analytics.ipynb: v1.0.1.

As shown in the examples above, the versioning of a data file may be easily readable. For example, a data file named "example-data.file: v2.4.2," would indicate that two major updates, four minor updates, and two patch updates have been made since the file was originated. In this manner semantic version control module 220 may generate, as output, new semantic version of each asset in the data file and new semantic version to the data file itself.

At block 330, semantic versioning server 205 may optionally be configured to push, send, or transmit the new semantic version for each asset to clients having an outdated version and/or notify clients having an outdated version that the new semantic version has been generated and that the new version is ready for download and/or retrieval. As used herein, an outdated version of a data file is a data file that is not the most current version of that data file. That is, if a new version is created based on a major change to an asset within the data file, any version of the data file that does not have the most updated asset is an outdated version. In an embodiment, when a major change occurs to a data file, all downstream users/consumers may be notified that the change has occurred. In embodiments, the downstream users/consumers may be notified via email, a text message, a pop-up message when the data file is accessed, an error message when the data file is accessed, or another means for alerting the users/consumers/client computers that the data file has experienced a major change that may render their downstream processes and procedures inoperable if the newest version is not used. In other embodiments, when a major change occurs to a data file, the new version may be optionally pushed/transmitted to downstream users/consumers/client computers such that those users/consumers are prompted to access/update the version they are using for their processes and procedures. In an embodiment, pushing the new version may further include requiring downstream users to update the version of the asset or data file before using that asset or data file. In embodiments where the new version(s) are pushed/transmitted to downstream users/consumers, the pushed new versions may be used by the downstream users/consumers/client computers to perform downstream computing functions, computations, applications, and/or any other task that may rely on the previous and/or new version of the data asset and/or data file.

In some embodiments, semantic versioning server 205 and the downstream users/consumers/client computers may be owned or controlled by (e.g., owned and/or operated by) the same entity (e.g., enterprise, company, service provider, management company, cloud, etc.). In other embodiments, semantic versioning server 205 and the downstream users/consumers/client computers may be controlled by different entities.

Figure 4:
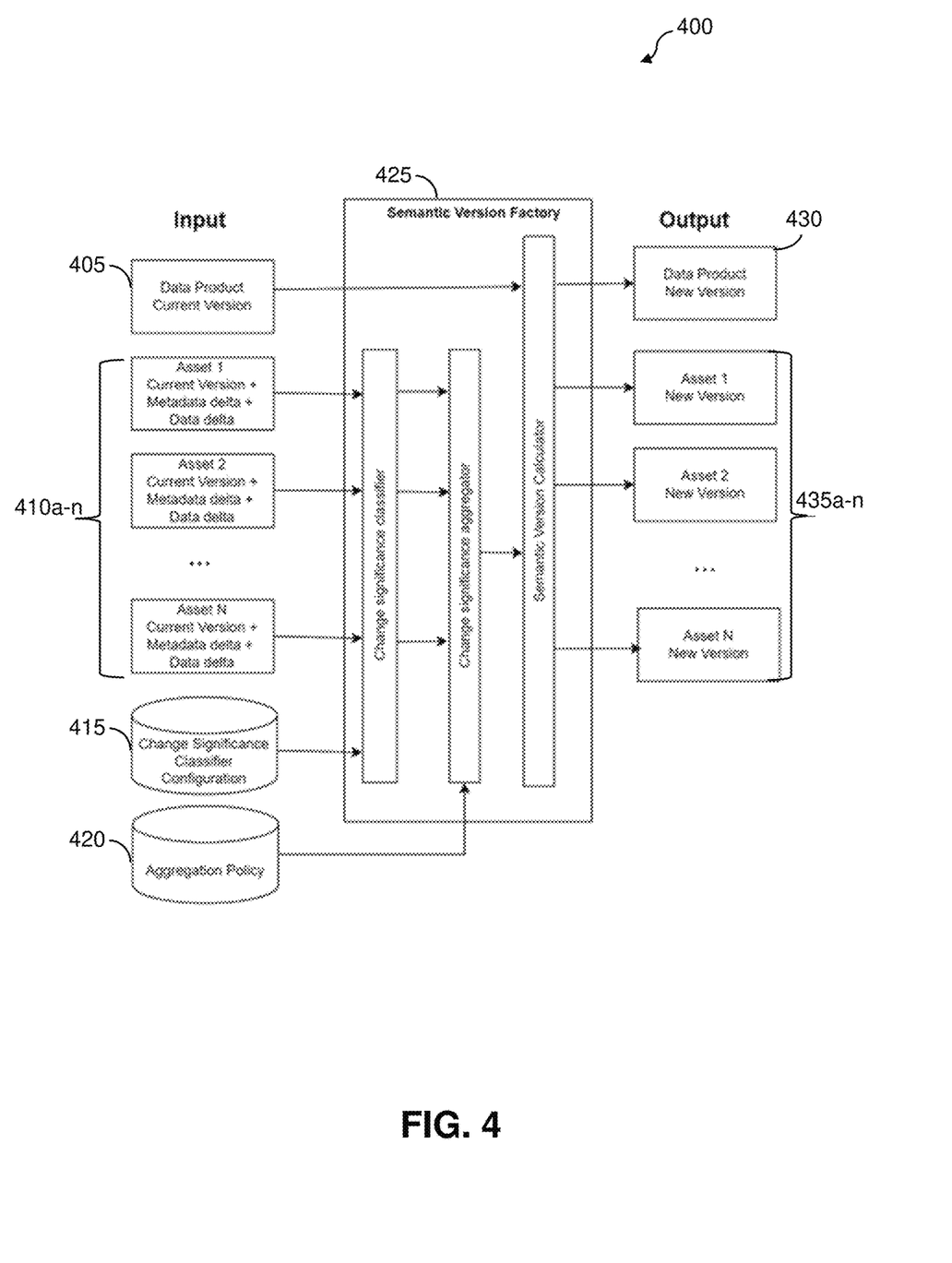
FIG. 4 shows a block diagram of an exemplary environment in accordance with aspects of the present invention.

FIG. 4 shows a block diagram of exemplary environment 400 in accordance with aspects of the invention. In embodiments, environment 400 includes inputs (405, 410a-n, 415, and 420), semantic version factory 425, and outputs (430 and 435a-n). Specifically, the inputs include data product current version 405 (i.e., the current/previous version of the data product/file), assets 410a-n each comprising a current version, a metadata delta, and a data delta of the respective asset, change significance classifier configuration 415, and aggregation policy 420.

Each of the inputs are fed into semantic version factory 425 where the inputs are analyzed in accordance with the methods described with respect to FIGS. 2 and 3. In embodiments, the semantic version factory 425 may comprise one or more instances of semantic versioning server 205 of FIG. 2. Within semantic version factory 425 assets 410a-n and change significance classifier configuration 415 are evaluated by a change significance classifier, such as evaluation module 210 and/or level detection and aggregation module 215 of FIG. 2, in accordance with the methods described with respect to blocks 305-315 of FIG. 3. In other words, semantic version factory 425 detects changes to each of assets 410a-n over time and identifies a level of change for each of assets 410a-n, based on change significance classifier configuration 415 (i.e., the evaluation criteria).

The inputs are further fed to, and evaluated by, a change significance aggregator, such as level detection and aggregation module 215 of FIG. 2, in accordance with block 320 of FIG. 3. In other words, semantic version factory 425 aggregates levels of changes by aggregating the identified level of each change to each of assets 410a-n, based on aggregation policy 420.

Semantic version factory 425 further generates a new semantic version for data product current version 405 and each of assets 410a-n at the semantic version calculator before outputting the data product new version 430 (i.e., the new version of the data file) and new versions of assets 410a-n, which are outputted as new version assets 435a-n.

Figure 5:
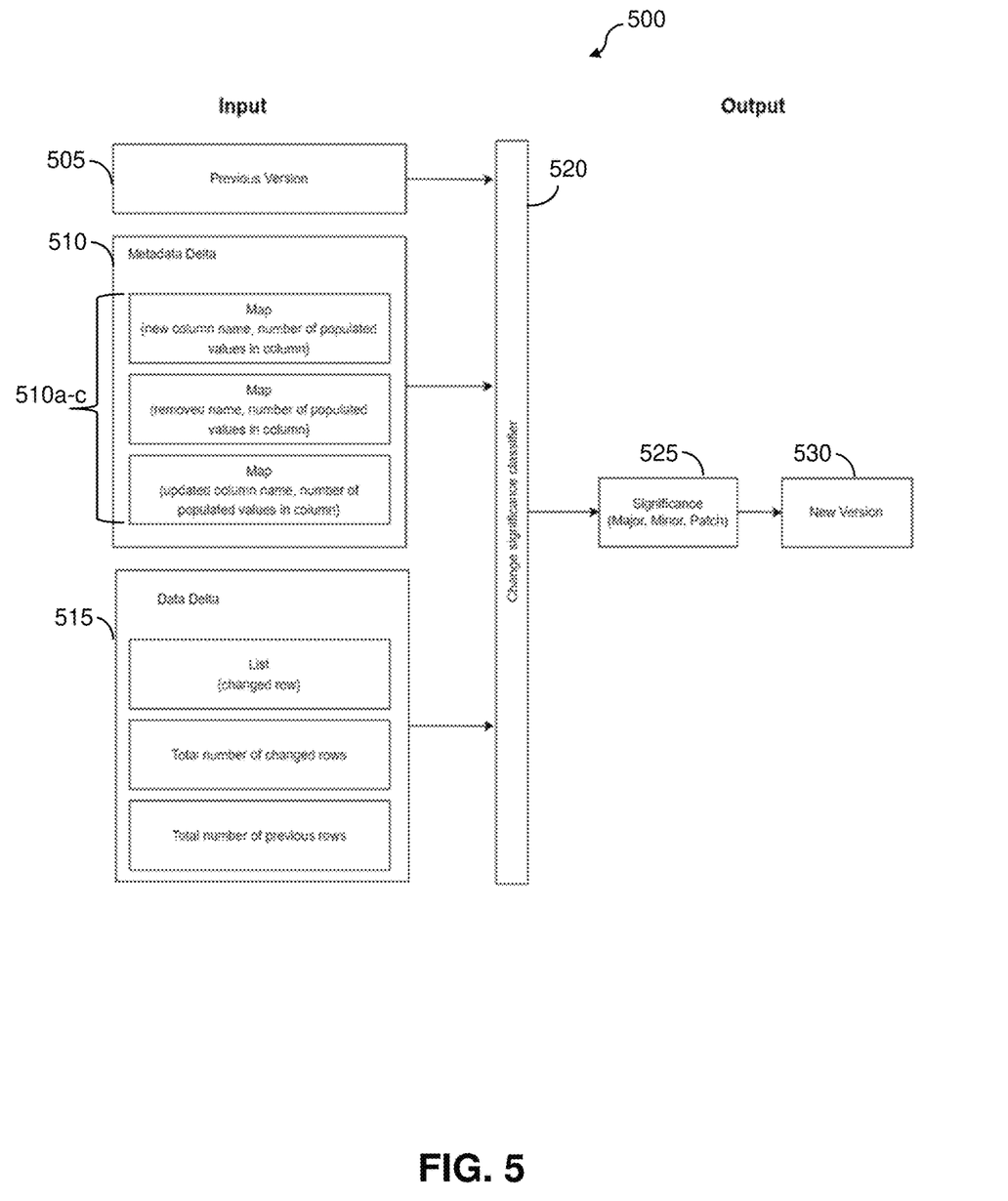
FIG. 5 shows a block diagram of an exemplary environment in accordance with aspects of the present invention.

FIG. 5 shows a block diagram of exemplary environment 500 in accordance with aspects of the invention. In embodiments, environment 500 illustrates a simplified method for how structured data of an asset, such as one of assets 410a-n of FIG. 4, may be analyzed and/or processed. In embodiments, the structured data is analyzed in accordance with blocks 310-325 of FIG. 3. As inputs, previous version 505 (i.e., the current version of the asset), metadata delta 510, and data delta 515 are evaluated by change significance classifier 520, which may include instances of evaluation module 210 and/or level detection and aggregation module 215 of FIG. 2 and may be evaluated in accordance with blocks 310-320 of FIG. 3. As illustrated, metadata delta 510 comprises metadata maps 510a-c, which describe metadata changes that might occur in a structured dataset-a new column name, a removed name, and/or an updated column name.

In embodiments, data delta 515 comprises the actual data changes such as lists of changed rows, total number of changed rows, and total number of previous rows. As illustrated, change significance classifier 520 detects changes to each of assets over time and identifies a level of change for each of assets based on evaluation criteria, as described above. In FIG. 5, the level of change is indicated by significance block 525, which assigns a major, minor, or patch change to the asset after evaluating the changes (e.g., in accordance with blocks 325-320 of FIG. 3) and before a new version of the asset is calculated and assigned as new version 530 (e.g., in accordance with block 325 of FIG. 3).

Figure 6:
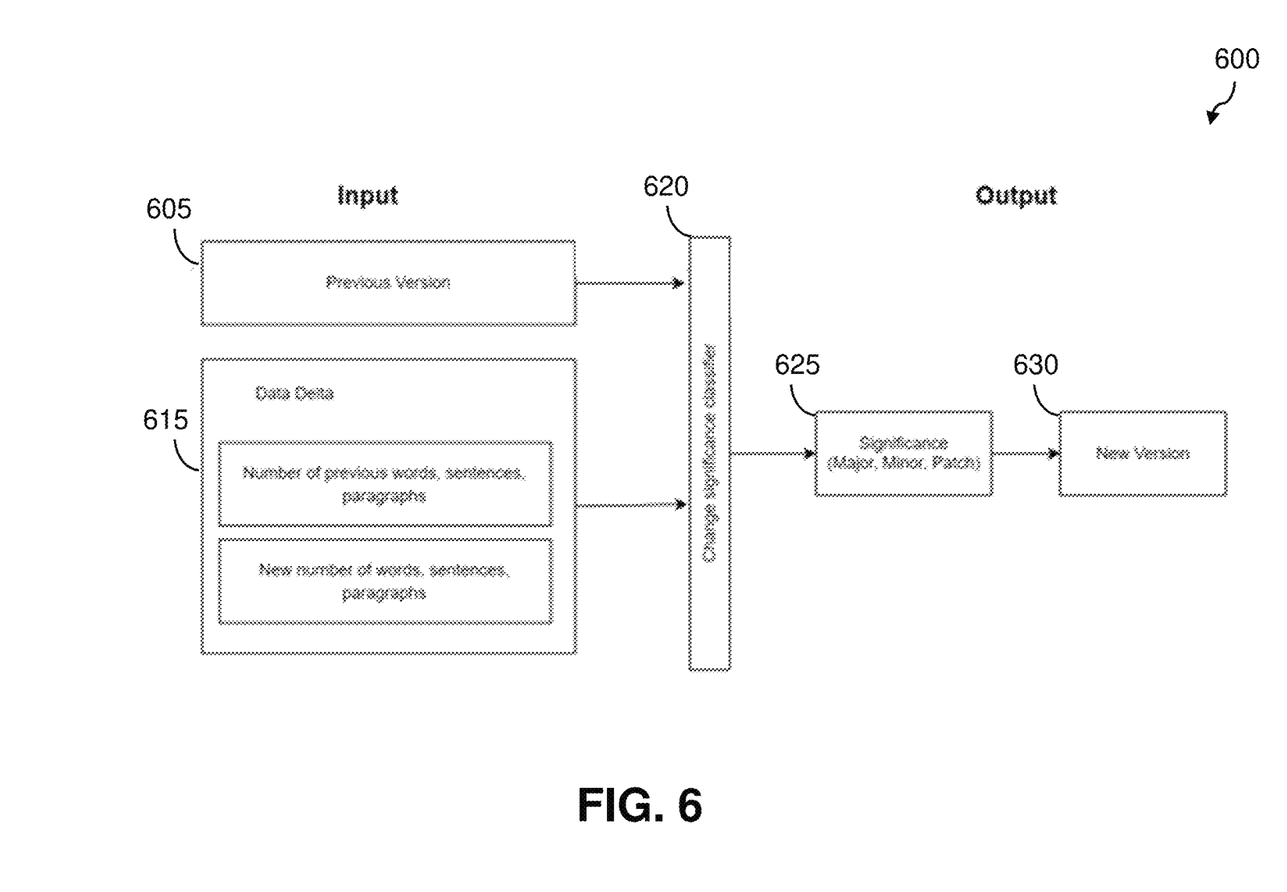
FIG. 6 shows a block diagram of an exemplary environment in accordance with aspects of the present invention.

FIG. 6 shows a block diagram of exemplary environment 600 in accordance with aspects of the invention. In embodiments, environment 600 illustrates a simplified method for how unstructured data of an asset, such as one of assets 410a-n of FIG. 4, may be analyzed and/or processed. In embodiments, the structured data is analyzed in accordance with blocks 310-325 of FIG. 3. As inputs, previous version 605 (i.e., the current version of the asset and data delta 615 are evaluated by change significance classifier 620, which may include instances of evaluation module 210 and/or level detection and aggregation module 215 of FIG. 2 and may be evaluated in accordance with blocks 310-320 of FIG. 3.

In embodiments, data delta 615 comprises actual data changes such as number of previous words, sentences, and paragraphs and a new number of words, sentences, and paragraphs. As illustrated, change significance classifier 520 detects changes to each of assets over time and identifies a level of change for each of assets based on evaluation criteria, as described above. In FIG. 5, the level of change is indicated by significance block 625, which assigns a major, minor, or patch change to the asset after evaluating the changes (e.g., in accordance with blocks 325-320 of FIG. 3) and before a new version of the asset is calculated and assigned as new version 630 (e.g., in accordance with block 325 of FIG. 3).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, aspects of the invention provide a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system may include one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a processor set, evaluation criteria comprising rules for evaluating changes to a data file, wherein the data file comprises a plurality of assets;
detecting, by the processor set over time, at least one change to one or more assets of the plurality of assets;
identifying, by the processor set, a category for the at least one change, based on the received evaluation criteria;
in response to identifying a category for a plurality of changes, aggregating, by the processor set, the identified category of each of the plurality of changes of each asset of the data file;
in response to the aggregated categories exceeding one or more predetermined thresholds, generating, by the processor set, a new semantic version for each changed asset of the plurality of assets and a new semantic version for the data file overall; and
pushing the new semantic version for each changed asset to at least one client computer having an outdated version of at least one changed asset, such that the at least one client computer uses the new semantic version for downstream tasks.

2. The computer-implemented method of claim 1, wherein the received evaluation criteria further comprises rules for defining a major change, a minor change, and a patch change.

3. The computer-implemented method of claim 1, wherein the data file comprises a plurality of asset types.

4. The computer-implemented method of claim 3, wherein the data file comprises structured data and unstructured data.

5. The computer-implemented method of claim 1, wherein identifying the category for the at least one change is performed using a machine learning algorithm.

6. The computer-implemented method of claim 5, further comprising training the machine learning algorithm to identify categories for the at least one change to structured data or to unstructured data.

7. The computer-implemented method of claim 1, further comprising calculating a weight for each asset of a plurality of assets, wherein identifying the category for the at least one change is further based on the calculated weight for each asset.

8. The computer-implemented method of claim 1, wherein the processor set and the at least one client computer are controlled by the same entity.

9. The computer-implemented method of claim 1, further comprising notifying the at least one client computer that the new semantic version has been generated.

10. A computer program product comprising one or more computer readable storage media having program instructions collectively stored on the one or more computer readable storage media, the program instructions executable to:
receive evaluation criteria comprising rules for evaluating changes to a data file, wherein the data file comprises a plurality of assets;
detect at least one change to one or more assets of the plurality of assets;
identify a category for the at least one change, based on the received evaluation criteria;
in response to identifying a category for a plurality of changes, aggregate the identified category of each of the plurality of changes of each asset of the data file;
in response to the aggregated categories exceeding one or more predetermined thresholds, generating a new semantic version for each changed asset of the plurality of assets and a new semantic version for the data file overall; and
push the new semantic version for each changed asset to at least one client computer having an outdated version of at least one changed asset, such that the at least one client computer uses the new semantic version for downstream tasks.

11. The computer program product of claim 10, wherein the data file comprises a plurality of data types comprising structured and unstructured data.

12. The computer program product of claim 10, wherein the program instructions are further executable to identify the category for the at least one change is performed using a machine learning algorithm.

13. The computer program product of claim 12, wherein the program instructions are further executable to train the machine learning algorithm to identify categories for the at least one change to structured data or to unstructured data.

14. The computer program product of claim 10, wherein the program instructions are further executable to notify clients having an outdated version that the new semantic version has been generated.

15. A system comprising:
a processor set, one or more computer readable storage media, and program instructions collectively stored on the one or more computer readable storage media, the program instructions executable to:
receive evaluation criteria comprising rules for evaluating changes to a data file, wherein the data file comprises a plurality of assets;
detect at least one change to one or more assets of the plurality of assets;
identify a category for the at least one change, based on the received evaluation criteria;

in response to identifying a category for a plurality of changes, aggregate the identified category of each of the plurality of changes of each asset of the data file;

in response to the aggregated categories exceeding one or more predetermined thresholds, generating a new semantic version for each changed asset of the plurality of assets and a new semantic version for the data file overall; and push the new semantic version for each changed asset to at least one client computer having an outdated version of at least one changed asset, such that the at least one client computer uses the new semantic version for downstream tasks.

16. The system of claim 15, wherein the received evaluation criteria further comprises rules for defining a major change, a minor change, and a patch change.

17. The system of claim 15, wherein the data file comprises a plurality of asset types.

18. The system of claim 15, wherein the program instructions are further executable to identify the category for the at least one change is performed using a machine learning algorithm.

19. The system of claim 15, wherein the program instructions are further executable to train the machine learning algorithm to identify categories for the at least one change to structured data or to unstructured data.

20. The system of claim 15, wherein the program instructions are further executable to notify clients having an outdated version that the new semantic version has been generated.

* * * * *